US012234430B1

(12) United States Patent
Perlman

(10) Patent No.: US 12,234,430 B1
(45) Date of Patent: *Feb. 25, 2025

(54) ENHANCING SOLUBILITY OF WATER IN MCT OIL USING ALCOHOLS

(71) Applicant: Perlman Consulting, LLC, Arlington, MA (US)

(72) Inventor: Daniel Perlman, Arlington, MA (US)

(73) Assignee: PERLMAN CONSULTING, LLC, Arlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,946

(22) Filed: Mar. 26, 2024

(51) Int. Cl.

| | |
|---|---|
| ***C11D 3/20*** | (2006.01) |
| ***C10M 105/36*** | (2006.01) |
| ***C10M 129/06*** | (2006.01) |
| ***C10M 169/04*** | (2006.01) |
| ***C11D 3/37*** | (2006.01) |
| ***C11D 3/48*** | (2006.01) |

(52) U.S. Cl.
CPC ............ *C11D 3/2086* (2013.01); *C11D 3/201* (2013.01); *C11D 3/2082* (2013.01); *C11D 3/3765* (2013.01); *C11D 3/48* (2013.01)

(58) Field of Classification Search
CPC ..... C11D 3/2006; C11D 3/2065; C11D 7/261; C11D 9/265; C11D 9/267; C10M 169/04; C10M 105/36; C10M 129/06; C10N 2040/34
See application file for complete search history.

(56) References Cited

U.S. PATENT DOCUMENTS

| | | | | |
|---|---|---|---|---|
| 10,327,452 B2 | | 6/2019 | Lao | |
| 11,946,011 B1 | * | 4/2024 | Perlman ............... | C10M 105/36 |
| 2011/0098366 A1 | * | 4/2011 | Groteluschen ......... | A61K 9/006 514/784 |

FOREIGN PATENT DOCUMENTS

| | | | | |
|---|---|---|---|---|
| CN | 110522690 B | | 9/2022 | |
| EP | 3421096 A1 | | 1/2019 | |
| KR | 20190129143 A | | 11/2019 | |
| WO | WO 2020/053665 | * | 3/2020 | ........... A61K 31/454 |
| WO | WO-2020053665 A2 | * | 3/2020 | ........... A61K 31/454 |

OTHER PUBLICATIONS

Fox et al. Vegetable oil-based lubricants—A review of oxidation. Tribology International, 40, 2007, 1035-1046.
Wikipedia. WD-40. 2019. 1-4. https://en.wikipedia.org/wiki/WD-40.

* cited by examiner

*Primary Examiner* — Brian P Mruk
(74) *Attorney, Agent, or Firm* — Arrigo, Lee, Guttman & Mouta-Bellum LLP

(57) ABSTRACT

The invention relates to MCT oil/alcohol compositions without visible clouding or phase separation between the MCT and alcohol components at room temperature. The invention encompasses MCT oil/alcohol compositions containing MCT oil, alcohol, and water. The MCT oil/alcohol compositions can be used for mixing oil-soluble, alcohol-soluble, and water-soluble compounds, and for lubricating, disinfecting, sterilizing, cleaning, and coating surfaces.

20 Claims, No Drawings

ENHANCING SOLUBILITY OF WATER IN MCT OIL USING ALCOHOLS

BACKGROUND OF THE INVENTION

Triglycerides that include both fats and oils are found in natural sources such as animal fats, and plant seeds, beans, and nuts, and contain a glycerol backbone esterified with three fatty acid chains. Glycerol with its three carbon backbone is found in multiple lipids including glycerides, aka acylglycerols, including mono- di- and triglycerides. Glycerol is also known as propanetriol, 1,2,3-propanetriol, 1,2,3-trihydroxypropane, glycerine, glycerin, or propane-1, 2,3-triol. Glycerol is represented in formula 1.

formula 1

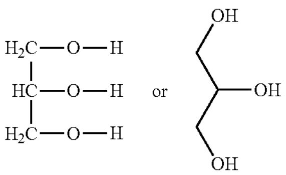

Medium chain triglycerides (MCTs) contain glycerol and medium-chain fatty acids (MCFAs), which are fatty acids having from 6 to 12 carbon atoms. In MCTs, of the three esterified fatty acids, either two or three are MCFAs. MCTs may contain a mixture of different MCFAs and often contain a small amount of shorter or longer chain length fatty acids. In contrast to MCFAs, short-chain fatty acids contain five or fewer carbons, and long-chain fatty acids contain 13 to 21 carbons. Very long chain fatty acids contain 22 or more carbons. MCT oils are normally liquid at ambient or "room" temperature.

Similar to many other oils, there is negligible solubility of either water in MCT oil, or MCT oil in water, either at ambient temperature or at boiling water temperature . . . Nevertheless, the introduction of water into MCT oil would be desirable in many applications and for a variety of reasons. For example, many compounds are water-soluble, but not oil-soluble. The ability to introduce water with water-soluble compounds into MCT oil could significantly enhance the utility of MCT oils along with these compounds in food, pharmaceutical and personal care applications.

To overcome the above-mentioned solubility problems, solubilization reagents such as lysophosphatidylcholine/lecithin have been used to create emulsions and other micellar-type liquid compositions. See, e.g., EP 3421096 A1. A wide variety of solubilization and emulsification reagents and methods have been utilized, e.g., polysorbates, glycerol (glycerin) and macrogols (polyethylene glycol, PEG) to name a few, as well as micelle and liposome application technologies. Id.

There is a need in the art for alternative MCT oil-containing liquid compositions that can include water as a component of a homogeneous solution rather than being a component of a suspension, emulsion, dispersion or micellar-type liquid composition that is not a true solution at the molecular level. The present invention fulfills this need.

BRIEF SUMMARY OF THE INVENTION

The invention encompasses MCT oil/alcohol compositions containing MCT oil and alcohol without visible clouding or phase separation between the MCT and alcohol components at room temperature. Preferably, the MCT oil/alcohol compositions of the invention contain by weight from 25% to 75% alcohol, and from 25% to 75% MCT oil. The MCT oil/alcohol compositions can contain water in low/no (1.1% or less water) or high (more than 1.1% water) amounts.

The invention encompasses MCT oil/high water/alcohol compositions containing more than 1.1% water, without visible clouding or phase separation between the MCT and alcohol components at room temperature. Preferably, the MCT oil/high water/alcohol compositions of the invention contain by weight from 1.2% to 12% water, from 4.5% to 95% alcohol, and from 4.5% to 95% MCT oil.

The invention encompasses MCT oil/low water/alcohol compositions containing 1.1% or less water, without visible clouding or phase separation between the MCT and alcohol components at room temperature. Preferably, the MCT oil/low water/alcohol compositions of the invention contain by weight from 1.1% or less water, from 25% to 75% alcohol, and from 25% to 75% MCT oil.

In some embodiments, the alcohol is n-propanol, ethanol, isopropanol, tert-butyl alcohol, sec-butyl alcohol, allyl alcohol, or a combination thereof. Preferably, the alcohol is n-propanol, ethanol, or isopropanol.

In various embodiments, the MCT oil/alcohol composition contains 1.1% or less water by weight.

In various embodiments, the MCT oil/alcohol composition contains more than 1.1% water and less than 13% water by weight.

In various embodiments, the MCT oil/alcohol composition has a 2:1 to 1:2 weight ratio of MCT oil to alcohol.

In various embodiments, the MCT oil and the alcohol comprise at least 91% of the MCT oil/alcohol composition by weight.

In various embodiments, the MCT oil and the alcohol comprise at least 95% of the MCT oil/high water/alcohol composition by weight.

In various embodiments, the MCT oil and the alcohol comprise at least 98% of the MCT oil/alcohol composition by weight.

In various embodiments, the MCT oil and the alcohol comprise at least 99% of the MCT oil/alcohol composition by weight.

In various embodiments, the MCT oil/alcohol composition comprises an antioxidant at a concentration of from about 50 to about 500 ppm. In various embodiments, the antioxidant comprises BHA, BHT, TBHQ, propyl gallate, or a combination thereof.

In various embodiments, the MCT oil/alcohol composition comprises a metal cation chelating agent at a concentration of from about 20 to about 200 ppm. In various embodiments, the metal cation chelating agent comprises citric acid, malic acid, glycolic acid, lactic acid, tartaric acid, ethylenediaminetetraacetic acid (EDTA), or a combination thereof.

In various embodiments, the MCT oil/alcohol composition comprises by weight from 1.2% to 5% water.

In various embodiments, the MCT oil/alcohol composition comprises by weight from 1.2% to 2.5% water.

In various embodiments, the MCT oil/alcohol composition comprises by weight from 40% to 60% alcohol.

In various embodiments, the MCT oil/alcohol composition comprises by weight from 40% to 60% MCT oil.

The invention encompasses a method for making an MCT oil/alcohol composition comprising mixing together MCT oil with an azeotrope form of an alcohol containing from 4.4% to 30% water by weight.

The invention encompasses a method of lubricating a surface comprising applying an MCT oil/alcohol composition to a surface.

DETAILED DESCRIPTION OF THE INVENTION

Surprisingly, it was found that, unlike the very poor solubility of hydrous ethanol in conventional anhydrous vegetable oils such as corn and soybean oils, ethanol containing water and isopropanol containing water could form a single homogeneous and transparent solution (homogeneous at the molecular level) with MCT oil. The present invention allows the introduction of water and water-soluble compounds into MCT oil.

Accordingly, the mixture of MCT oil with water with alcohol provides a "Swiss army knife-like" multi-task solvent composition. That is, this mixture can allow the addition of oil-soluble, water-soluble, and alcohol-soluble substances to a composition.

Surprisingly, MCT oil could be mixed with 95% ethanol (95:5 ethanol:water by weight) at weight ratios of 95:5 to 5:95 to form a single homogeneous phase. MCT oil could also be mixed with 90% ethanol (90:10 ethanol:water) but, however, only to a limited extent. Thus at a weight ratio of 95:5 (MCT:alcohol) a single homogeneous phase was obtained, while at 90:10 (MCT:alcohol), two phases formed (a lower MCT phase and an upper ethanol phase). Moreover, MCT oil could be mixed with 90% ethanol at a weight ratio of 10:90 and form a single homogeneous phase, but at 20:80 formed two phases. Similarly, MCT oil could be mixed with 88% isopropanol (88:12 isopropanol:water) at weight ratios of 95:5 to 5:95 to form a single homogeneous phase.

It is intriguing that the effective and wide-ranging dispersibility and dissolution of water into MCT oil when accompanied by ethanol occurs for the water-ethanol azeotropic composition in which water and ethanol molecules are strongly associated with one another. Interestingly, calculating the number of ethanol versus water molecules in the published weight ratio composition of 95.63%:4.37% for the azeotropic mixture, the ratio is 8.55 ethanol molecules per water molecule. While not being bound by theory, it appears likely that approximately 8 ethanol molecules surround and partially mask each water molecule inside a roughly spherical or cubic array or complex of ethanol molecules. This geometry may allow the azeotrope ethanol-water complex to mix with MCT oil much like miscible 100% ethanol, whereas a 90:10 mixture in the present example with twice the ratio of water molecules as the 95:5 mixture does not readily mix well with MCT oil due to the excess of chemically "exposed" water molecules.

In terms of boiling points and vapor pressures, isopropyl alcohol (aka, IPA, isopropanol or 2-propanol, M.W.60) is quite similar to ethanol (M.W.46). The IPA-water azeotrope boils at 80.4° C. and the ethanol-water azeotrope boils at 78.2° C. Interestingly, the water contents of these two azeotropes differ substantially (approximately 12% for IPA compared to only approximately 4.4% for ethanol). This difference translates to a large difference in the calculated stoichiometric ratios of alcohol molecules to water molecules in these two azeotropes, i.e., approximately 8.5:1 for ethanol and only 2.2:1 for IPA. This difference suggests that the IPA molecule can associate with far more water than the ethanol molecule, and this feature may be beneficial where solutes requiring more water for their solubilization are being added, as well as MCT oil.

With the water-alcohol azeotropes for both ethanol and IPA, these azeotropes appear to maintain very tight water-alcohol associations in the presence of MCT oil. This is interesting, given the potential for partial or full partition of the alcohol component (without water) into the MCT oil. Such partition would be evident because such free water would precipitate and cloud the liquid. It is evident that while the above-described triple solvent system has significant compositional flexibility, it has limited flexibility for further addition of water that is found to cause clouding and likely phase separation.

The invention encompasses MCT oil/alcohol, MCT oil/high water/alcohol, or MCT oil/low water/alcohol compositions containing MCT oil, alcohols such as ethanol and isopropanol, and water.

MCT Oil

Saturated fatty acids have no carbon-carbon double bonds (C═C). They have the same formula $CH_3(CH_2)nCOOH$, with variations in "n" ranging from about 6 to about 22. A common saturated fatty acid is stearic acid (n=16, total number of carbons=18, also referred to as a "C18" fatty acid. Typically, a saturated fatty acid is denoted by the number of carbons 'C' (18 for stearic acid), a colon ':', and the number of double bonds '0' (0 for stearic acid). Stearic acid can thus be denoted as C18:0. Some other common fatty acids are: caproic acid (Hexanoic acid), $CH_3(CH_2)_4COOH$, or C6:0; enanthic acid (heptanoic acid), $CH_3(CH_2)_5COOH$, or C7:0; caprylic acid (octanoic acid), $CH_3(CH_2)_6COOH$, or C8:0; pelargonic acid (nonanoic acid), $CH_3(CH_2)_7COOH$, or C9:0; capric acid (decanoic acid), $CH_3(CH_2)_8COOH$, or C10:0; undecylic acid (undecanoic acid), $CH_3(CH_2)_9COOH$, or C11:0; and lauric acid (dodecanoic acid), $CH_3(CH_2)_{10}COOH$, or C12:0. The fatty acids of MCTs are most commonly C8:0, C10:0, and C12:0, because the odd-carbon numbered fatty acids (e.g., C7:0, C9:0, and C11:0) are less common. The MCT oil/alcohol, MCT oil/high water/alcohol, or MCT oil/low water/alcohol compositions disclosed herein can include one or more of C6:0, C7:0, C8:0, C9:0, C10:0, C11:0, and C12:0, all of which are medium-chain fatty acids and can be esterified to form various MCTs.

As used herein, unsaturated fatty acids have one or more C═C double bonds. The C═C double bonds can provide either cis or trans isomers.

The MCT oil can comprise caprylic acid (C8:0). In various embodiments, the MCT oil comprises 0%, 5%, 10%, 20%, 30%, 40%, 50% to 60%, 70%, 80%, 90, 95%, 98%, or 100% by weight caprylic acid.

The MCT oil can comprise capric acid (C10:0). In various embodiments, the MCT oil comprises 0%, 5%, 10%, 20%, 30%, 40%, 50% to 60%, 70%, 80%, 90, 95%, 98%, or 100% by weight capric acid.

The MCT oil can comprise weight lauric acid (C12:0). In various embodiments, the MCT oil comprises 0%, 5%, 10%, 20%, 30%, 40%, 50% to 60%, 70%, 80%, 90, 95%, 98%, or 100% by weight lauric acid.)

Preferably, the total of caprylic acid, capric acid, and lauric acid in the MCT oil is 100%.

In various embodiments, the MCT oil consists essentially of triglycerides having a fatty acid composition of about 20% to about 98% by weight caprylic acid (C8:0), 0% to about 60% by weight capric acid (C10:0), and 0% to about 20% by weight lauric acid (C12:0), wherein the total of said caprylic acid, capric acid, and lauric acid is 100%. In various embodiments, the weight ratio of C8:0 to C10:0 fatty acids is from about 2.5:1 to about 1:2. In various embodiments, the triglycerides are essentially devoid of lauric acid (C12:0).

In various embodiments, the MCT oil is food grade. In some embodiments, the MCT oil is a well-known, food-compatible medium chain triglyceride oil, such as those commercially available from KRAFT CHEMICAL CO. and STEPAN LIPID NUTRITION, for example, Neobee® M-5. These products are liquid at "room temperature" which as used herein means 20-25° C.

In the MCT oil of the present invention, long chain fatty acids are preferably kept to a low level, or avoided altogether. MCTs typically are produced by interesterification reactions or re-esterification reactions, such that the total population of fatty acids becomes rearranged and reassembled into new triglyceride molecules. Generally, MCTs do not contain long chain fatty acids, although a low level can be added during the interesterification or re-esterification reactions. The lack of long chain fatty acids provides higher oxidative stability, a long shelf life, and a lack of rancidity.

The presence of long chain fatty acids in a triglyceride can be associated with susceptibility to oxidation, which is a serious problem with use of vegetable oils as lubricants or coatings. Use of MCT oil reduces this susceptibility to oxidation compared to vegetable oil.

Hydrolytic processing of palm kernel oil or coconut oil with specifically targeted fractional distillation can provide substantial quantities of purified single species or mixed species of medium chain fatty acids (MCFAs). Selective re-esterification of these purified MCFAs with glycerol can be used to produce the reconstituted triglyceride oils known as MCTs. These MCTs can contain either single species or mixed species of 12, 10, and/or 8 carbon fatty acids. The weight ratios of 8, 10, and 12 carbon fatty acids in MCT oils can be tailored to the various physical and chemical properties required. Preferred weight ratios of C8:0 to C10:0 fatty acids are from about 50:1 to about 1:4, or from about 2.5:1 to about 1:1. In some embodiments, the MCT oil is essentially devoid of lauric acid (C12:0).

MCT oils containing approximately 60:40, 70:30 or 98:2 weight ratios of caprylic acid to capric acid are commercially available in nutritional supplements. Re-esterification of the same MCFAs with propylene glycol rather than glycerol can produce defined medium chain propylene glycol oils (MCPG oils) having two rather than three fatty acids per molecule.

Alcohols

The alcohol can be any alcohol that is soluble with MCT oil. In some embodiments, the alcohol is n-propanol, sec-butyl alcohol, tert-butyl alcohol, ethanol, isopropanol, allyl alcohol, or a combination thereof. The alcohol is preferably ethanol, isopropanol, n-propanol, or a combination thereof.

The alcohols used herein include alcohols in their azeotrope form, preferably ethyl alcohol (aka, ethanol $C_2H_5OH$) in its water-azeotrope form (95.6% by weight alcohol and 4.4% by weight water), and isopropyl alcohol ($C_3H_7OH$) in its azeotrope form (87.7% by weight alcohol and 12.3% by weight water).

The following are azeotrope forms of various alcohols with water (alcohol:water by weight):

ethanol—95.63%: 4.37%
1-propanol—71.7%:28.3%
2-propanol—87.7%:12.3%
sec-butyl alcohol—67.9%:32.1%
tert-butyl alcohol—88.3%:11.7%
allyl alcohol—72.9%:27.1%.

Use of an azeotrope form of an alcohol allows mixing of the azeotrope form with MCT oil to form a composition with no visible clouding or phase separation between the MCT and alcohol components at room temperature. Preferably the azeotrope form of the alcohol is mixed with MCT oil at a ratio of between 3:1 and 1:3 azeotrope form: MCT oil.

The term "an azeotrope form of an alcohol" as used herein means a mixture of an alcohol and water, wherein the percentages of alcohol:water in the azeotrope are +/−1% of the true azeotrope weight percentage values, for example, for an ethanol:water azeotrope: 94.6 to 96.6% ethanol and 4-5% water and for an isopropanol:water azeotrope: 87.2-88.2% 2-propanol and 11.8-12.8% water.

Additionally, use of a level of water at or less than that of the true azeotrope weight percentage values of an alcohol allows mixing of alcohol and water with MCT oil to form a composition with no visible clouding or phase separation between the MCT and alcohol components at room temperature.

Water

The water can be provided from numerous sources and purity depending on the application. Preferably, the water contains less than 20%, 10%, 5%, 2%, 1%, 0.01%, or 0.001% other components. In various embodiments, the water is deionized, de-mineralized, reverse-osmosis purified, distilled water, or tap water.

MCT Oil/Alcohol Compositions

An "MCT oil/alcohol composition" as described herein contains MCT oil and alcohol, with no visible clouding or phase separation between the MCT and alcohol components at room temperature.

The invention encompasses MCT oil/alcohol compositions containing water and alcohol(s) in the form of true solutions (homogeneous mixtures of molecules), without the creation of emulsions, dispersions, suspensions, micellar-type liquid compositions. Preferably, the MCT oil/alcohol composition contains no lysophosphatidylcholine or lecithin.

In some embodiments, the MCT oil/alcohol composition of the invention contains by weight from 0% to 12% water, from 5% to 95% alcohol, and from 5% to 95% MCT oil. In some embodiments, the MCT oil/alcohol composition of the invention contains by weight from 0% to 12% water, from 25% to 75% alcohol, and from 25% to 75% MCT oil.

In various embodiments, the MCT oil/alcohol composition of the invention comprises at least 4.5%, 5%, 10%, 20%, 30%, 40%, 50%, 60%, 70%, 80%, 85%, 90, or 95% by weight of MCT oil.

In various embodiments, the MCT oil/alcohol composition of the invention comprises at least 4.5%, 5%, 10%, 20%, 30%, 40%, 50%, 60%, 70%, 80%, 85%, 90, or 95% by weight of an alcohol.

In various embodiments, the MCT oil/alcohol composition of the invention comprises more than or at least 0.01%, 0.02%, 0.05%, 1.0%, 1.1%, 1.2%, 1.3%, 1.4%, 1.5%, 2.0%, 3.0% 4.0%, 5.0%, 6.0%, 7.0%, 8.0%, 8.5%, 9.0, 10%, 11%, 12%, 15%, or 20% by weight of water.

In various embodiments, the MCT oil/alcohol composition of the invention comprises, at most, 20%, 15%, 10%, 9%, 8%, 7%, 6%, 5%, 6%, 5%, 4%, 3%, 2%, 1.1%, 1.0% 0.9%, 0.8%, 0.7%, 0.6%, 0.5%, 0.4%, 0.3%, 0.2%, 0.1%, or 0.0% by weight of water.

In various embodiments, the MCT oil/alcohol composition of the invention comprises a range of water between any of the following values: 0.0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 2.0%, 3.0% 4.0%, 5.0%, 6.0%, 7.0%, 8.0%, 8.5%, 9.0%, 10%, 11%, 12%, 15%, or 20% by weight of water, for example, between 5% and 8.5%.

In some embodiments, the alcohol is n-propanol, sec-butyl alcohol, tert-butyl alcohol, ethanol, isopropanol, allyl alcohol, or a combination thereof. The alcohol is preferably ethanol, isopropanol, n-propanol, or a combination thereof.

In various embodiments, the MCT oil/alcohol composition has a 20:1, 10:1, 9:1, 8:1, 7:1, 6:1, 5:1, 4:1, 3:1, 2:1, 1:1 to 1:20, 1:10, 1:9, 1:8, 1:7, 1:6, 1:5, 1:4, 1:3, or 1:2 (or any range of ratios including these ratios, such as 4:1 to 1:1) weight ratio of MCT oil to alcohol.

In various embodiments, the MCT oil/alcohol, MCT oil/high water/alcohol, or MCT oil/low water/alcohol composition has a 2:1 to 1:2 weight ratio of MCT oil to alcohol and a 94:6 to 98:2 weight ratio of alcohol to water.

In various embodiments, the MCT oil/alcohol, MCT oil/high water/alcohol, or MCT oil/low water/alcohol composition has a 1:1 weight ratio of MCT oil to alcohol and a 94:6 to 98:2 weight ratio of alcohol to water.

In various embodiments, the MCT oil and the alcohol comprise at least 87%, 88%, 89%, 90%, 91%, 92%, 93%, 94%, 95%, 96%, 97%, 98%, 99%, or 100% of the MCT oil/alcohol composition by weight, or any range between any of these percentages, such as 95% to 100%.

In various embodiments, the MCT oil/alcohol composition has a 70:1, 75:1, 77:1, 88:12, 89:11, 90:10, 91:9, 92:8, 93:7, 94:6 to 95:5, 96:4, 97:3, 98:2, 99:1, or 100:0 (or any range of ratios including these ratios, such as 95:5 to 98:2) weight ratio of alcohol to water.

In various embodiments, the MCT oil/alcohol composition has a 94:6 to 98:1 weight ratio of alcohol to water.

In some embodiments, the MCT oil/alcohol composition comprises by weight from 25% to 75%, 30% to 70%, 35% to 65%, or 40% to 60% alcohol, and from 25% to 75%, 30% to 70%, 35% to 65%, or 40% to 60% MCT oil, wherein the MCT oil and the alcohol comprise at least 88%, 89%, 90%, 91%, 92%, 93%, 94%, 95%, 96%, 97%, 98%, 99%, or 100% of the MCT oil/alcohol composition by weight.

In some embodiments, the MCT oil/alcohol comprises 1.1% or less water.

In some embodiments, the MCT oil/alcohol comprises more than 1.1% water, preferably less than 13% water.

In various embodiments, the MCT oil/alcohol composition contains no water.

In some embodiments, the MCT oil/alcohol composition is an "MCT oil/high water/alcohol composition" as defined herein.

In some embodiments, the "MCT oil/alcohol composition is an "MCT oil/low water/alcohol composition" as defined herein.

MCT Oil/High Water/Alcohol Compositions

An "MCT oil/high water/alcohol composition" as described herein contains MCT oil, alcohol, and more than 1.1% water without visible clouding or phase separation between the MCT and alcohol components at room temperature. It may also contain other additional compounds.

The invention encompasses MCT oil/high water/alcohol compositions containing water and alcohol(s) in the form of true solutions (homogeneous mixtures of molecules), without the creation of emulsions, dispersions, suspensions, micellar-type liquid compositions. Preferably, the MCT oil/high water/alcohol composition contains no lysophosphatidylcholine or lecithin.

In some embodiments, the MCT oil/high water/alcohol composition of the invention contains by weight from 1.2% to 12% water, from 4.5% to 95% alcohol, and from 4.5% to 95% MCT oil.

In various embodiments, the MCT oil/high water/alcohol composition of the invention comprises at least 4.5%, 5%, 10%, 20%, 30%, 40%, 50%, 60%, 70%, 80%, 85%, 90, or 95% by weight of MCT oil.

In various embodiments, the MCT oil/high water/alcohol composition of the invention comprises at least 4.5%, 5%, 10%, 20%, 30%, 40%, 50%, 60%, 70%, 80%, 85%, 90, or 95% by weight of an alcohol.

In various embodiments, the MCT oil/high water/alcohol compositions of the invention comprises more than 1.1%, or at least 1.2%, 1.3%, 1.4%, 1.5%, 2.0%, 3.0% 4.0%, 5.0%, 6.0%, 7.0%, 8.0%, 8.5%, 9.0, 10%, 11%, 12%, 15%, or 20 by weight of water.

In various embodiments, the MCT oil/high water/alcohol composition of the invention comprises, at most, 20%, 15%, 10%, 9%, 8%, 7%, 6%, 5%, 6%, 5%, 4%, 3%, 2%, 1.9%, 1.8%, 1.7%, 1.6%, 1.5%, 1.4%, 1.3%, or 1.2%, by weight of water.

In various embodiments, the MCT oil/high water/alcohol composition of the invention comprises a range of water between any of the following values: more than or at least 1.1%, 1.2%, 1.3%, 1.4%, 1.5%, 2.0%, 3.0% 4.0%, 5.0%, 6.0%, 7.0%, 8.0%, 8.5%, 9.0%, 10%, 11%, 12%, 15%, or 20% by weight of water, for example, between more than 3% and 9%.

In some embodiments, the alcohol is n-propanol, sec-butyl alcohol, tert-butyl alcohol, ethanol, isopropanol, allyl alcohol, or a combination thereof. The alcohol is preferably ethanol, isopropanol, n-propanol, or a combination thereof.

In various embodiments, the MCT oil/high water/alcohol composition has a 20:1, 10:1, 9:1, 8:1, 7:1, 6:1, 5:1, 4:1, 3:1, 2:1, 1:1 to 1:20, 1:10, 1:9, 1:8, 1:7, 1:6, 1:5, 1:4, 1:3, or 1:2 (or any range of ratios including these ratios, such as 4:1 to 1:1) weight ratio of MCT oil to alcohol.

In various embodiments, the MCT oil/high water/alcohol composition has a 4:1 to 1:4 weight ratio of MCT oil to alcohol and a 94:6 to 98:2 weight ratio of alcohol to water.

In various embodiments, the MCT oil/high water/alcohol composition has a 3:1 to 1:3 weight ratio of MCT oil to alcohol and a 94:6 to 98:2 weight ratio of alcohol to water.

In various embodiments, the MCT oil/high water/alcohol composition has a 2:1 to 1:2 weight ratio of MCT oil to alcohol and a 94:6 to 98:2 weight ratio of alcohol to water.

In various embodiments, the MCT oil/high water/alcohol composition has a 88:12, 89:11, 90:10, 91:9, 92:8, 93:7, 94:6 to 95:5, 96:4, 97:3, or 98:2, (or any range of ratios including these ratios, such as 95:5 to 98:2) weight ratio of alcohol to water.

In various embodiments, the MCT oil/high water/alcohol composition has a 1:1 weight ratio of MCT oil to alcohol and a 94:6 to 98:2 weight ratio of alcohol to water.

In various embodiments, the MCT oil and the alcohol comprise at least 87%, 88%, 89%, 90%, 91%, 92%, 93%, or 94% of the MCT oil/high water/alcohol composition by weight or any range between any of these percentages, such as 88% to 92%.

In one embodiment, the MCT oil/high water/alcohol composition comprises by weight from 25% to 75%, 30% to 70%, 35% to 65%, or 40% to 60% alcohol, and from 25% to 75%, 30% to 70%, 35% to 65%, or 40% to 60% MCT oil, wherein the MCT oil and the alcohol comprise at least 88%, 89%, 90%, 91%, 92%, 93%, 94% by weight of the MCT oil/high water/alcohol composition.

MCT Oil/Low Water/Alcohol Compositions

An "MCT oil/low water/alcohol composition" as described herein contains MCT oil, alcohol, and 1.1% or less water with no visible clouding or phase separation between the MCT and alcohol components at room temperature.

The invention encompasses MCT oil/low water/alcohol compositions containing water and alcohol(s) in the form of true solutions (homogeneous mixtures of molecules), without the creation of emulsions, dispersions, suspensions, micellar-type liquid compositions. Preferably, the MCT oil/low water/alcohol composition contains no lysophosphatidylcholine or lecithin.

In some embodiments, the MCT oil/low water/alcohol composition of the invention contains by weight from 0% to 1.1% water, from 5% to 95% alcohol, and from 5% to 95% MCT oil.

In various embodiments, MCT oil/low water/alcohol composition of the invention comprises at least 4.5%, 5%, 10%, 20%, 30%, 40%, 50%, 60%, 70%, 80%, 85%, 90, or 95% by weight of MCT oil.

In various embodiments, the MCT oil/low water/alcohol composition of the invention comprises at least 4.5%, 5%, 10%, 20%, 30%, 40%, 50%, 60%, 70%, 80%, 85%, 90, or 95% by weight of an alcohol.

In various embodiments, the MCT oil/low water/alcohol compositions of the invention comprises at least 1.0% 0.9%, 0.8%, 0.7%, 0.6%, 0.5%, 0.4%, 0.3%, 0.2%, 0.1%, or 0.0% by weight of water.

In various embodiments, the MCT oil/low water/alcohol compositions of the invention comprises, at most, 1.1%, 1.0% 0.9%, 0.8%, 0.7%, 0.6%, 0.5%, 0.4%, 0.3%, 0.2%, 0.1%, or 0.0% by weight of water.

In various embodiments, the MCT oil/low water/alcohol composition of the invention comprises a range of water between any of the following values: 1.1%, 1.0% 0.9%, 0.8%, 0.7%, 0.6%, 0.5%, 0.4%, 0.3%, 0.2%, 0.1%, or 0.0% by weight of water, for example, between 0.7% and 0.9%.

In some embodiments, the alcohol is n-propanol, sec-butyl alcohol, tert-butyl alcohol, ethanol, isopropanol, allyl alcohol, or a combination thereof. The alcohol is preferably ethanol, isopropanol, n-propanol, or a combination thereof.

In various embodiments, the MCT oil/low water/alcohol composition has a 20:1, 10:1, 9:1, 8:1, 7:1, 6:1, 5:1, 4:1, 3:1, 2:1, 1:1 to 1:20, 1:10, 1:9, 1:8, 1:7, 1:6, 1:5, 1:4, 1:3, or 1:2 (or any range of ratios including these ratios, such as 4:1 to 1:1) weight ratio of MCT oil to alcohol.

In various embodiments, the MCT oil/low water/alcohol composition has a 95:5, 96:4, 97:3, 98:2, 99:1, or 99.5:0.5 (or any range of ratios including these ratios, such as 97:3 to 99:1 weight ratio of alcohol to water.

In various embodiments, the MCT oil/low water/alcohol composition has a 4:1 to 1:4 weight ratio of MCT oil to alcohol and a 98:2 to 99.5:0.5 weight ratio of alcohol to water.

In various embodiments, the MCT oil/low water/alcohol composition has a 3:1 to 1:3 weight ratio of MCT oil to alcohol and a 98:2 to 99.5:0.5 weight ratio of alcohol to water.

In various embodiments, the MCT oil/low water/alcohol composition has a 2:1 to 1:2 weight ratio of MCT oil to alcohol and a 98:2 to 99.5:0.5 weight ratio of alcohol to water.

In various embodiments, the MCT oil/low water/alcohol composition has a 1:1 weight ratio of MCT oil to alcohol and a 98:2 to 99.5:0.5 weight ratio of alcohol to water.

In various embodiments, the MCT oil and the alcohol comprise at least 87%, 88%, 89%, 90%, 91%, 92%, 93%, 94% 95%, 96%, 97%, 98%, 99%, 99.1%, 99.2%, 99.3%, 99.4%, 99.5%, 99.6%, 99.7%, 99.8%, 99.9% or 100% by weight of the MCT oil/low water/alcohol composition or any range between any of these percentages, such as 91% to 97%.

In one embodiment, the MCT oil/low water/alcohol composition comprises by weight from 25% to 75%, 30% to 70%, 35% to 65%, or 40% to 60% alcohol, and from 25% to 75%, 30% to 70%, 35% to 65%, or 40% to 60% MCT oil, wherein the MCT oil and the alcohol comprise at least 95%, 96%, 97%, 98%, 99%, or 100% by weight of the MCT oil/low water/alcohol composition.

Additional Components in Compositions

The MCT oil/alcohol, MCT oil/high water/alcohol, and MCT oil/low water/alcohol compositions can have additional components beyond MCT oil, alcohol, and water. Preferably, the MCT oil/alcohol, MCT oil/high water/alcohol, or MCT oil/low water/alcohol composition comprises less than less than 20%, 15%, 10%, 5%, 4%, 3%, 2%, or 1% by weight of these other components.

In various embodiments, the additional component is one or more drug substance, fragrance, flavoring, colorant, preservative, antioxidant, metal chelator, protein, or peptide. In preferred embodiments, these components are water and/or alcohol soluble.

The ability of water-soluble, alcohol-soluble, and/or oil-soluble components to be solubilized in the MCT oil composition can allow the MCT oil composition to provide an ideal solvent for pharmaceutical products.

In various embodiments, the MCT composition comprises a water-soluble, alcohol-soluble, and/or oil-soluble drug component(s). In some embodiments, the MCT composition is a cold, pain, cough, or allergy medicine. In some embodiments, the MCT composition comprises THC or CBD cannabinoids.

In various embodiments, the additional component is an agent or are agents to prevent MCT decomposition, which are added to the composition so as to ensure exceptional long-term stability. Preferred stabilizers are antioxidants and chelators. These agents together neutralize oxidants present in the environment and multivalent metal ions that can catalyze the decomposition of triglycerides and that are often present on objects or surfaces to be lubricated and/or coated. Typically, only small amounts of functional additives need be added to MCT oil/alcohol, MCT oil/high water/alcohol, or MCT oil/low water/alcohol compositions to serve as effective chemical protectants.

MCT oil/alcohol, MCT oil/high water/alcohol, and MCT oil/low water/alcohol compositions of the invention can be supplemented with one or more protective agents to extend the composition's working life on a surface. One or more primary and secondary antioxidants can be added to the MCT oil/alcohol, MCT oil/high water/alcohol, or MCT oil/low water/alcohol composition at levels that are considered food-safe under FDA guidelines or at higher levels if the lubricant is not applied to food contact surfaces. For example, the food-compatible, MCT oil-soluble antioxidant, tertiary butylhydroquinone (TBHQ), is widely used in vegetable oils under FDA guidelines at levels up to 200 ppm, or at levels between 50 and 100 ppm, between 100 and 200 ppm or at higher levels such as up to 500 ppm if not ingested. Similar levels can be appropriate for the antioxidants BHA, BHT, and propyl gallate, which can inactivate most reactive oxygen species.

Further, because MCT oil/alcohol, MCT oil/high water/alcohol, and MCT oil/low water/alcohol compositions may be exposed to oxidized metal surfaces (e.g., steel tools and household fixtures), the working life of MCT oil/alcohol, MCT oil/high water/alcohol, and MCT oil/low water/alcohol compositions may be extended by addition of agents preventing hydrolytic decomposition. As stated above, such decomposition may be catalyzed by a number of metals and their cations including, for example, iron, copper and aluminum and their associated multivalent cations, (e.g., $Fe^{3+}$, $Cu^{2+}$ and $Al^{3+}$). Hydrolytic damage to MCTs can be substantially reduced or even blocked by addition to MCT oil/alcohol, MCT oil/high water/alcohol, or MCT oil/low water/alcohol compositions of low levels of multivalent metal ion chelators, for example, citric acid (e.g., added at levels—from about 50 to about 500 ppm or from about 100 to about 200 ppm), or similar levels of ascorbic acid, and/or tartaric acid. Other examples of metal ion chelators are ethylene diamine tetra-acetic acid (EDTA), pyridoxal isonicotinoyl hydrazone (PIH), N,N,N',N'-tetrakis(2-pyridylmethyl)ethylenediamine (TPEN), triethylene-tetramine (Trien), N,N-diethyldithiocarbamate (DeDTC), N'-[5-(Acetyl-hydroxy-amino)pentyl]-N-[5-[3-(5-aminopentyl-hydroxy-carbamoyl) propanoylamino]pentyl]-N-hydroxy-butane diamide (Deferoxamine), 3-hydroxy-1,2-dimethylpyridin-4(1H)-one (Deferiprone), and 4-(3,5-Bis(2-hydroxyphenyl)-1H-1,2,4-triazol-1-yl)benzoic acid (Deferasirox).

The following antioxidants are well-known and accepted antioxidants and may be added separately or in combination: BHA, BHT, TBHQ, propyl gallate and citric acid. Propylene glycol can be used as a carrier solvent to dissolve these agents and to add them at FDA-prescribed levels to natural, fractionated and interesterified vegetable oils including MCT oil. For example, Kemin Industries, Inc. (Des Moines, IA) produces a variety of antioxidant blends containing one or more of the above-listed antioxidants dissolved in propylene glycol that are suitable for addition. One blend known as EN-HANCE® A129 combines 20% TBHQ with 10% citric acid dissolved in 70% by weight propylene glycol. The TBHQ is a primary antioxidant that limits reactive oxygen and free radical attack on the oil, together with citric acid, a secondary antioxidant and/or chelation agent that helps to inactivate contaminating metal ions such as copper, iron and aluminum cations, thereby limiting hydrolytic breakdown of the oil. Effective levels of these two antioxidants in an MCT oil/alcohol, MCT oil/high water/alcohol, or MCT oil/low water/alcohol composition may be applied to a food preparation surface and remain consistent with FDA food regulations is approximately 200 ppm TBHQ and 100 ppm citric acid.

Methods of Making

An MCT oil/alcohol, MCT oil/high water/alcohol, or MCT oil/low water/alcohol composition can be made by mixing together water, MCT oil and alcohol. In a preferred embodiment, MCT oil is mixed with alcohol containing water.

In various embodiments, the MCT oil is mixed together with an azeotrope of water and an alcohol, preferably an ethanol:water azeotrope or an isopropanol:water azeotrope. The preparation of an azeotrope prior to mixing with the MCT oil can facilitate quick preparation of a composition with no visible clouding or phase separation between the MCT and alcohol components at room temperature.

In various embodiments, water, MCT oil, and alcohol are combined sequentially in any order, all of which are contemplated.

In various embodiments, a drug substance, fragrance, flavoring, colorant, preservative, antioxidant, metal chelator, protein, or peptide is added to the mixture at an appropriate step (e.g., water-soluble added to water prior to mixing). In preferred embodiments, these components are oil, water and/or alcohol soluble.

In some embodiments, the method further includes adding at least one antioxidant and at least one metal chelator to the MCT oil/high water/alcohol composition. The one or more antioxidants and one or more metal chelators remain soluble in the final composition during storage.

In some embodiments, the alcohol is n-propanol, sec-butyl alcohol, tert-butyl alcohol, ethanol, isopropanol, allyl alcohol, or a combination thereof. The alcohol is preferably ethanol, isopropanol, n-propanol, or a combination thereof.

Preferably, the antioxidant is BHA (butylated hydroxyanisole), BHT (butylated hydroxytoluene), TBHQ, propyl gallate, or a combination thereof. Other useful food grade antioxidants include citric acid, ascorbic acid and tocopherols. A preferred antioxidant is TBHQ, wherein TBHQ is present in the composition at a concentration of about 10 ppm or greater, of about 25 ppm or greater, of about 50 ppm or greater, of about 75 ppm or greater, or of about 100 ppm or greater. The concentration of an antioxidant can be in the range from about 10 ppm to about 1000 ppm, in the range from about 10 ppm to about 500 ppm, in the range from about 20 ppm to about 200 ppm, in the range from about 20 ppm to about 400 ppm, in the range from about 30 ppm to about 300 ppm, in the range from about 50 ppm to about 300 ppm, or in the range from about 100 ppm to about 200 ppm.

Examples of metal cation chelating agents are citric acid, ascorbic acid, tartaric acid and EDTA. Significantly, certain carboxylic acid-containing molecular species such as citric acid can provide both antioxidant and chelating activities.

The MCT oil/alcohol, MCT oil/high water/alcohol, or MCT oil/low water/alcohol composition can be suitable for aerosol or hand spray pump delivery. For aerosol delivery, the method of preparing the composition further includes addition of an aerosol propellant including a liquified or compressed gas. Examples of non-toxic propellants include but are not limited to nitrogen, nitrous oxide, carbon dioxide, and mixtures thereof. Examples of other propellant gases include but are not limited to propane, butane, isobutane, and other liquified or compressed gases. An aerosol spray container can include an internal pressure chamber that is compressed when the aerosol spray can is filled with a lubricating composition. The pressure chamber can include, for example, compressed air, or a physical force element (e.g., spring, piston, polymer package). The internal pressure chamber can thereby provide pressure to dispense the lubricating composition from the aerosol spray can. The methods of preparing a packaged MCT based lubricant composition can further include sterilization of the composition and parts of the container in contact with the composition, or used for dispensing the composition. Sterilization can be accomplished by using the solvent of the composition itself, e.g., ethanol or isopropanol, or by a separate sterilization step, such as irradiation.

Methods of Use

MCT oil/alcohol compositions can facilitate the addition of water-soluble compounds into MCT oil without any emulsifier, such a phosphatidyl choline or lecithin.

In various embodiments, MCT oil/alcohol, MCT oil/high water/alcohol, or MCT oil/low water/alcohol composition can be used to solubilize a water, oil, and/or alcohol soluble component. Preferably this component is one or more drug substance, fragrance, flavoring, colorant, preservative, antioxidant, metal chelator, protein, or peptide. Thus, the MCT oil/alcohol, MCT oil/high water/alcohol, or MCT oil/low water/alcohol composition can be used as a pharmaceutical or household product.

In various embodiments, MCT oil/alcohol, MCT oil/high water/alcohol, or MCT oil/low water/alcohol compositions can be used in fragrance and/or perfume oils.

The ability of water-soluble, alcohol-soluble, and/or oil-soluble components to be solubilized in the MCT oil composition allows the MCT oil composition to provide an ideal solvent for pharmaceutical products.

In various embodiments, the MCT oil/alcohol, MCT oil/high water/alcohol, or MCT oil/low water/alcohol composition comprises a water-soluble, alcohol-soluble, and/or oil-soluble drug component(s). In some embodiments, the MCT oil/alcohol, MCT oil/high water/alcohol, or MCT oil/low water/alcohol composition is a cold, pain, cough, or allergy medicine. In some embodiments, the MCT oil/alcohol, MCT oil/high water/alcohol, or MCT oil/low water/alcohol composition comprises THC or CBD cannabinoids.

The MCT oil/alcohol, MCT oil/high water/alcohol, or MCT oil/low water/alcohol composition can be used as a household product, i.e., used in the home environment for lubricating, disinfecting, sterilizing, cleaning, and coating surfaces or used in a business or commercial environment as an industrial product, i.e., used in a manufacturing, assembling or servicing facility environment for lubricating, disinfecting, sterilizing, cleaning, and coating surfaces. Uses of the compositions include, for example, prevention of rust or oxidation of metal parts, elimination of squeaks in moving parts, cleaning and protection of wood surfaces, and lubrication. The compositions can be safe and non-toxic, making them suitable for use on food preparation surfaces such as cutting boards and counter surfaces.

MCT oil/alcohol, MCT oil/high water/alcohol, and MCT oil/low water/alcohol compositions can include high amounts of alcohol, for example, 70% 80%, 90%, or 95% by weight, for broad and effective antimicrobial use. To obtain antifungal properties, certain alcohols may be used at higher concentrations. One or more anti-fungal agents may be added to the compositions disclosed herein. In an embodiment, an alcohol such as isopropyl alcohol and a bitter taste agent such as denatonium benzoate or Bitrex can be added to discourage ingestion or abuse of ethanol, and may be added to the MCT oil/high water/alcohol composition. 5 parts isopropyl alcohol added to every 100 parts 200 proof ethanol can be used in commerce in solvents, cleaning solutions, disinfectants and other miscellaneous solutions for example.

The invention encompasses the use of MCT oil/alcohol, MCT oil/high water/alcohol, or MCT oil/low water/alcohol compositions as stabilized, non-toxic lubricant and coating compositions. The compositions can be applied, preferably by spraying, for a variety of general uses, such as lubricating, coating, sterilizing, and/or cleaning of household objects with moving parts or with metal, wood, or plastic surfaces. The compositions including the MCT-based lubricants can also be formulated as an antimicrobial sanitizer and cleaner.

The MCT oil/alcohol, MCT oil/high water/alcohol, or MCT oil/low water/alcohol composition can contain a concentration of alcohol that lowers viscosity to allow application by spraying. The dynamic viscosity of the present compositions is preferably less than about 100 millipascal seconds (mPa·s) at 20° C., alternatively expressed in kinematic viscosity units as approximately 100 Centistoke units (abbreviated cSt) at 20° C., or less than about 50 cSt at 20° C., or less than about 40 cSt at 20° C., or less than about 30 cSt at 20° C., or less than about 20 cSt at 20° C., or less than about 10 cSt at typically 20° C. or 40° C. A lower viscosity is preferred for use in a spray pump or aerosol spray application.

Viscosity is a measure of a fluid's resistance to deformation or sheer stress. It is a measure of the "thickness" of a liquid. For example, kinematic viscosity can be measured in Centistoke units for example, at about 20° C. Water at 20° C. has a kinematic viscosity of approximately 1.0 cSt. The centistoke (cSt) and milliPascal second units are alternative units of kinematic and dynamic viscosities respectively. While various known instruments and methods exist for measuring viscosity, a common method involves a drip cup, which is filled with the liquid to be measured and includes a small hole in the bottom of the cup. The measurement involves measuring the amount of time required for the liquid to fall out of the hole of the cup, and the time is compared to a reference table.

As the viscosity of a fluid increases, it will tend to form larger droplets when sprayed from a spray pump or an aerosol sprayer. For very viscous fluids, this can have a detrimental effect on coating applications, as small droplets sizes are favored in order to ensure an even coating. In order to dispense higher viscosity fluids, the fluid pressure can be increased during spraying, as increased pressure will reduce the droplet size; however, spraying at higher pressures also increases the flow rate, making the spray difficult to control and possibly raising a safety concern.

After application of the MCT oil/alcohol, MCT oil/high water/alcohol, or MCT oil/low water/alcohol composition of the invention to a surface or object, the alcohol and water in the composition may evaporate, leaving behind the MCT oil and any other non-volatile components of the composition. The use of an alcohol-water mixture that forms an azeotrope allows the synchronous evaporation of the alcohol and water, preventing the separation of the MCT oil/alcohol, MCT oil/high water/alcohol, or MCT oil/low water/alcohol composition into two phases.

The oxidation status of MCT oil/alcohol, MCT oil/high water/alcohol, or MCT oil/low water/alcohol composition can be assessed by known measurements such as, for example, standardized Active Oxygen Method (AOM) tests performed at approximately 100° C. Using this method, the so-called "induction period" for any triglyceride-based oil can be measured. This induction period is the incubation time (at a preselected temperature) required for an edible oil to commence rapid acceleration of oxidative breakdown. Standard AOM values for the MCT oils described in Examples 1-2, measured according to the AOCS (American Oil Chemists' Society) Official Method Cd 12-57 (i.e., times measured at 100° ° C. for a 20 ml sample to reach a peroxide value of 100 meq/kg oil), are approximately 500 hours at 100° C. Thus, MCT oils for use in the present technology possess high oxidative stability compared with the far lower AOM values of 49 hours for commercial palm oil and 16 hours for canola oil (see, e.g., Anwar et al., *JAOCS.* 80, 151-155, 2003). The AOM value for olive oil, which contains a high level of monounsaturated oleic acid, is 31 hours (Läubli, M. W. & Bruttel, P. A., *J. Am. Oil Chem. Soc.* 63, 792-793, 1986). Because all of the fatty acids in MCT oils are saturated, MCT oils have high oxidative stabilities, with ten- to thirty-fold greater AOM values compared to common vegetable oils.

The presently described MCT based household lubricant compositions can be formulated to be edible and suitable for use on and around food contact surfaces. A number of antioxidant agents are FDA-approved for addition to edible oils.

The compositions containing MCT oils disclosed herein preferably have a shelf-life of at least one year, at least two years, at least three years, at least four years, or at least five years. As used herein, "shelf-life" refers to the period of time during which a material may be stored in a sealed container, not exposed to light, at ambient temperature, and still remain suitable for its intended use.

Preferably, the MCT oil/alcohol, MCT oil/high water/alcohol, or MCT oil/low water/alcohol compositions have all of their fatty acids being saturated, most preferably having melting points that are lower than about 0° C.

In some embodiments, the MCT oil/alcohol, MCT oil/high water/alcohol, or MCT oil/low water/alcohol composition comprises at least 1%, 10%, 20%, 30%, 40%, 50%, 60%, 70%, 80%, or 90% by weight of alcohol that acts as a miscible thinning agent for the MCT oil to enable and/or improve aerosol spray delivery. Preferably, the alcohol is ethanol, 1-propanol, 2-propanol, or a combination thereof. Other low toxicity or non-toxic solvents may be used, and examples are directed to safety based on FDA or US pharmacopeia standards.

When a MCT oil/alcohol, MCT oil/high water/alcohol, or MCT oil/low water/alcohol composition as disclosed herein is sprayed or applied to a surface or object for lubrication or coating, the alcohol and water can evaporate, leaving a non-toxic lubricant (essentially pure MCT oil, or MCT oil containing a small amount of antioxidant and/or metal chelator additives) remaining on the surface. As used herein, a non-toxic lubricant refers to a lubricant that is safe for skin contact or for food contact after solvent evaporation.

For example, the FDA recognizes that high concentrations (e.g., ≥60% vol/vol to ≥75% vol/vol) of ethanol or isopropyl alcohol are safe for use in hand sanitizers ("Temporary Policy for Preparation of Certain Alcohol-Based Hand Sanitizer Products During the Public Health Emergency (COVID-19) Guidance for Industry", Updated Feb. 10, 2021, U.S. Department of Health and Human Services, Food and Drug Administration (FDA) Center for Drug Evaluation and Research). In one embodiment, after application of a MCT oil/high water/alcohol composition, most of the alcohol and water can evaporate, leaving behind MCT oil, which can contain less solvent (or essentially no solvent) than FDA limits that are still generally recognized as safe.

In another embodiment, a MCT oil/alcohol, MCT oil/high water/alcohol, or MCT oil/low water/alcohol composition is utilized to clean a cutting board. After application to the cutting board, most of the alcohol and water evaporates, leaving behind the MCTs and stabilizers. When the alcohol is ethanol, ethanol is regulated by the FDA as a food ingredient (i.e., additive) and is considered a Generally Recognized as Safe (GRAS) ingredient (21 C.F.R. 184.1293).

In some embodiments, the main ingredients of the MCT oil/alcohol, MCT oil/high water/alcohol, or MCT oil/low water/alcohol compositions are MCT oil, water, an alcohol such as ethanol, and other ingredients, including one or more antioxidant compounds and one or more metal chelators, as well as optional ingredients such as odorants, colorants, additional solvents, viscosity modifiers, thickeners, rust preventers, fats or oils, medications, and the like, are present at less than about 1%, less than about 0.5%, less than about 0.2%, or less than about 0.1% by weight.

Applying or spraying the compositions can be accomplished, for example, with pre-packaged wipes, with a dropper or droplet bottle, or pump bottle, or with an aerosol or pump spray container. The compositions can be used to sterilize and to clean a surface. The MCT based compositions disclosed herein can be supplied in a container of pre-saturated wipes. Each of the pre-saturated wipes can be used to sterilize surfaces, such as the interior of a car, a baby seat, or utensils. The pre-saturated wipes can be disposable and configured for one-time use, such as a sanitary wipe. The compositions can be provided in a bottle, such as a plastic or glass bottle. The bottle can include a spill-proof lid, a pump spray, or an applicator.

The present technology further provides a method for preventing oxidation of a surface. The method includes application of a layer of the MCT oil/alcohol, MCT oil/high water/alcohol, or MCT oil/low water/alcohol composition upon the surface.

If a household surface has been previously lubricated or coated with a layer of petroleum based material, or coated with conventional vegetable oils that have caked, polymerized and/or rancidified (e.g., wooden salad bowls and cutting boards), the present MCT oil/high water/alcohol compositions can be applied to the surface whereby the combination of alcohol and MCT oil (providing both hydrophilic and hydrophobic solvency) can strip away, remove, or dilute the pre-existing material, thereby decreasing the amount of unsightly residue and/or any accompanying toxicity from previous coatings.

In certain instances, some household surface toxins are hydrophobic and not easily displaced by aqueous cleaning solutions. The present MCT oil/high water/alcohol compositions can remove a hydrophobic toxin from a surface, by spraying or applying the MCT oil/high water/alcohol composition to the surface and wiping off any excess, whereby some or all of the toxin is removed.

After spraying or application, the MCT oil/alcohol, MCT oil/high water/alcohol, or MCT oil/low water/alcohol compositions described herein can be odor-free after application of the present MCT oil/high water/alcohol compositions, the ethanol or other nontoxic volatile solvent quickly evaporates, leaving behind an odor free residue of MCT oil.

The present MCT oil/alcohol, MCT oil/high water/alcohol, or MCT oil/low water/alcohol compositions can be used in methods for coating, lubricating, cleaning, and protecting both movable and static household objects such as squeaky door hinges, sticky locks, stubborn zippers, treadmills, wooden counter surfaces, cutting boards and salad bowls, appliance surfaces, rusted parts or parts that are susceptible to rusting including tools, toys, parts of boats, bicycles and motorcycles, such as chains, cables, and axles, and wide array of static and moving parts in diverse vehicles such as planes, trains and automobiles.

The present MCT oil/alcohol, MCT oil/high water/alcohol, or MCT oil/low water/alcohol compositions can be used in methods for extracting water-soluble, oil-soluble, and/or alcohol-soluble substances from plant materials.

EXAMPLES

To achieve the incorporation of water into a homogeneous molecular solution composition with MCT oil while avoiding the formation of an emulsion or other alternative liquid structure, either edible or substantially non-toxic alcohols including ethyl alcohol and/or propyl alcohol were considered as molecular bridging solvents in MCT solutions. Accordingly, alcohols were tested as candidates for "bridging the divide" between water and hydrophobic MCT oil (Neobee® M-5) that was produced and provided by STE- PAN LIPID NUTRITION, INC. and is a caprylic/capric triglyceride containing 66% by weight C8:0 and 32% by weight C10:0 esterified fatty acids to produce a single liquid phase in the form of a homogeneous solution of molecules. The technical challenge in approaching this problem is that depending upon relative chemical affinities, an alcohol could dissolve into MCT oil, leaving water to precipitate and partition away from the oil phase to form a cloudy separate aqueous liquid phase. Alternatively, an alcohol could dissolve into water and partition away from the MCT oil phase and form a separate aqueous phase.

Example 1. Water and MCT Oil Cannot Dissolve in One Another

Increasing proportions of water in M-5 MCT oil and M-5 MCT oil in water ranging from 1% to 100% by weight were mixed at room temperature and vigorously vortex-agitated forming translucent or cloudy dispersions and suspensions of water in oil and oil in water without dissolving in one another.

Example 2. Solubility of Aqueous Alcohol Containing 95% Ethanol and 5% Water in MCT Oil Increasing amounts of a 95% by weight ethanol solution containing 5% water were progressively added in small increments and mixed with 2.00 g M-5 MCT oil until the amount of 95% ethanol solution added, exceeded the amount of MCT oil by over 2-fold. While the mixtures remained clear at room temperature, they phase-separated when chilled to 4° C. into a more dense predominantly MCT-containing lower phase (about 1.2 ml) and a less dense predominantly alcohol-containing upper phase (exceeding 5 ml). When re-warmed to room temperature, the two phases recombined into a single homogeneous phase solution. Further doubling of the amount of 95% ethanol showed that a homogeneous solution with the MCT oil could be maintained as the MCT oil was further diluted. This experiment shows that MCT oil can be substantially diluted with 95% ethanol containing 5% by weight water.

Example 3. Very Limited Solubility of Aqueous Alcohol Containing 90% Ethanol and 10% Water in MCT Oil Increasing amounts of a 90% by weight ethanol solution (containing 10% by weight water) were progressively added to 2.00 g M-5 MCT oil in 0.10 g increments and mixed. The first 0.10 g addition accompanied by vigorous vortex mixing produced a clear homogeneous solution. Chilling to 4° C. caused phase separation that was reversed by re-warming to room temperature. However, further 0.10 g additions of the 90% ethanol:10% water to the MCT oil failed to dissolve in the MCT oil, producing only cloudy dispersions of water (or water-alcohol) in the MCT oil even with warming the mixed liquid to 40° C. Therefore, while water together with 95% by weight ethanol could readily disperse and dissolve in MCT oil (i.e., water when accompanied by a 19-fold excess of ethanol over water (95%/5%), only a small amount of water could disperse and dissolve when accompanied by a lesser 9-fold excess of ethanol over water (90%/10%).

Example 4. Assessment of MCT Solubility in Alcohol Concentrations Increasing from 87% Upward to 95% by Weight Ethanol, and Water Concentrations Decreasing from 13% Downward to 5%

A series of 1.00 gram samples of aqueous ethanol consisting of between 87% and 95% by weight 200 proof (100%) ethanol (in 1% incremental steps) and decreasing 1% steps of water (from 13% down to 5% by weight) were supplemented by successive additions of 10%, 20%, 30% and 40% MCT oil. All samples containing MCT oil additions were evaluated for achieving MCT solubility by monitoring visual transparency ("TR") versus clouding ("XX"). Table 1 below contains the data from this experiment. The results in Table 1 are consistent with those in Example 2 in which MCT mixing without any visible clouding or phase separation between the MCT and alcohol components at room temperature can be achieved when the water concentration in an ethanol-water solvent system is decreased to approximately 5% by weight or less (MCT being miscible with 200 proof (100%) ethanol).

TABLE 1

| Samples (1 g) | Ethanol (wt %) | Water (wt %) | +10% | +20% | +30% | +40% |
|---|---|---|---|---|---|---|
| | | | MCT Oil Additions (wt %) | | | |
| 1. | 87 | 13 | XX | XX | XX | XX |
| 2. | 88 | 12 | XX | XX | XX | XX |
| 3. | 89 | 11 | TR | XX | XX | XX |
| 4. | 90 | 10 | TR | XX | XX | XX |
| 5. | 91 | 9 | TR | XX | XX | XX |
| 6. | 92 | 8 | TR | XX | XX | XX |
| 7. | 93 | 7 | TR | TR | XX | XX |
| 8. | 94 | 6 | TR | TR | TR | XX |
| 9. | 95 | 5 | TR | TR | TR | TR |

Example 5. Clear Solutions are Obtained Combining MCT Oil and Water-Isopropyl Alcohol (IPA) Azeotrope that Contain 91% by Volume IPA (87.7% by Weight IPA and 12.3% by Weight Water)

The IPA azeotrope containing 87.7% IPA and 12.3% water by weight is readily available in drugstores (herein termed "91% IPA") and was used in the present experiments. M-5 MCT oil (0.50 g) was diluted 1:1 by mixing with 0.50 g of 91% IPA forming a clear solution containing a final concentration of approximately 44% by weight IPA, 6% by weight water and 50% by weight MCT oil. To determine the solubility limits of water in the latter solution, water increments were added 0.5% at a time. When water additions reached 2.0% (8.15% by weight total), the solution turned cloudy. The test was repeated and produced identical results. Therefore, the additional "water holding capacity" of the 1:1 mixed solution of MCT and 91% IPA was slightly more than 1.5% by weight or ¼ above the 6% water concentration contributed by the IPA azeotrope already present in the mixed solution. This water increment is useful and differs somewhat from the more stringent results for ethanol (Table 1, sample 9) in which the solution combined a ratio of 40% (0.4 parts) MCT with 1 part 95% ethanol:5% water (the azeotrope). That system would not accommodate even a 1% water content increase (increasing from 5% up to 6% water with 94% ethanol) without turning cloudy and phase-separating. That result can be compared with the present experiment in which the 1:1 MCT: 91% IPA could accommodate more water.

Example 6. MCT Oil can be Usefully Diluted Over a Wide Range when Combined with the Azeotrope of Isopropyl Alcohol (IPA) and Water that Contains 91% by Volume IPA (87.7% by Weight IPA) and 12.3% by Weight Water For solvent applications requiring the beneficial presence of three chemically diverse solvents including MCT oil, isopropyl alcohol (IPA), and water, a demonstration of mutual solvency at room temperature among these components would be highly useful (i.e., mixing without visible clouding or phase separation). Accordingly, ten mixtures containing increasing weight ratios of the water-alcohol azeotrope "91% IPA" and MCT oil, ranging from 1:1 to 10:1 (in single unit steps) were prepared. Each of these mixtures was vigorously vortex-blended and examined for mutual solvency, i.e., clarity versus clouding. All ten samples easily mixed, producing transparent crystal clear solutions.

The invention claimed is:

1. A medium chain triglyceride (MCT) oil/alcohol composition having a single homogeneous phase comprising by weight:

i) from 25% to 75% alcohol, ii) from 25% to 75% MCT oil, and iii) an antioxidant at a concentration of from about 50 to about 500 ppm;

wherein the MCT oil and the alcohol comprise at least 87% by weight of the MCT oil/alcohol composition.

2. The MCT oil/alcohol composition of claim 1, wherein the alcohol is isopropanol.

3. The MCT oil/alcohol composition of claim 1, wherein the alcohol is ethanol.

4. The MCT oil/alcohol composition of claim 1, comprising 1.1% or less water by weight.

5. The MCT oil/alcohol composition of claim 1, comprising more than 1.1% water and less than 13% water by weight.

6. The MCT oil/alcohol composition of claim 1, wherein the MCT oil/alcohol composition has a 2:1 to 1:2 weight ratio of MCT oil to alcohol.

7. The MCT oil/alcohol composition of claim 1, wherein the MCT oil and the alcohol comprise at least 91% of the MCT oil/alcohol composition by weight.

8. The MCT oil/alcohol composition of claim 1, wherein the MCT oil and the alcohol comprise at least 95% of the MCT oil/alcohol composition by weight.

9. The MCT oil/alcohol composition of claim 1, wherein the MCT oil and the alcohol comprise at least 98% of the MCT oil/alcohol composition by weight.

10. The MCT oil/alcohol composition of claim 1, wherein the MCT oil and the alcohol comprise at least 99% of the MCT oil/alcohol composition by weight.

11. The MCT oil/alcohol composition of claim 1, wherein the antioxidant comprises butylated hydroxyanisole (BHA), butylated hydroxytoluene (BHT), tertiary butylhydroquinone (TBHQ), propyl gallate, or a combination thereof.

12. A medium chain triglyceride (MCT) oil/alcohol composition having a single homogeneous phase comprising by weight:

i) from 25% to 75% alcohol, ii) from 25% to 75% MCT oil, and a metal cation chelating agent at a concentration of from about 20 to about 200 ppm;

wherein the MCT oil and the alcohol comprise at least 87% by weight of the MCT oil/alcohol composition.

13. The MCT oil/alcohol composition of claim 12, wherein the metal cation chelating agent comprises citric acid, malic acid, glycolic acid, lactic acid, tartaric acid, ethylenediaminetetraacetic acid (EDTA), or a combination thereof.

14. The MCT oil/alcohol composition of claim 1, comprising by weight from 1.2% to 5% water.

15. The MCT oil/alcohol composition of claim 1, comprising by weight from 1.2% to 2.5% water.

16. The MCT oil/alcohol composition of claim 1, comprising by weight from 40% to 60% alcohol.

17. The MCT oil/alcohol composition of claim 1, comprising by weight from 40% to 60% MCT oil.

18. A method for making the MCT oil/alcohol composition of claim 1 comprising mixing together MCT oil with an azeotrope form of an alcohol containing from 4.4% to 30% water by weight.

19. A method of lubricating a surface comprising applying the MCT oil/alcohol composition of claim 1 to the surface.

20. The MCT oil/alcohol composition of claim 12, wherein the MCT oil/alcohol composition comprises an antioxidant at a concentration of from about 50 to about 500 ppm.

* * * * *